(12) United States Patent
Traut et al.

(10) Patent No.: US 6,968,350 B2
(45) Date of Patent: Nov. 22, 2005

(54) METHOD FOR ESTABLISHING A VIRTUAL HARD DRIVE FOR AN EMULATED COMPUTER SYSTEM RUNNING ON A HOST COMPUTER SYSTEM

(75) Inventors: Eric P. Traut, San Carlos, CA (US);
Aaron S. Giles, Sunnyvale, CA (US);
Parag Chakraborty, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 09/918,295

(22) Filed: Jul. 30, 2001

(65) Prior Publication Data
US 2002/0147862 A1   Oct. 10, 2002

Related U.S. Application Data

(60) Provisional application No. 60/282,111, filed on Apr. 7, 2001.

(51) Int. Cl.$^7$ ............................................. G06F 17/30
(52) U.S. Cl. ............................. 707/205; 703/27; 711/6
(58) Field of Search .......................... 707/10, 204, 205; 709/208, 217, 203; 711/6; 703/27

(56) References Cited

U.S. PATENT DOCUMENTS

| | | | |
|---|---|---|---|
| 4,779,188 A | 10/1988 | Gum et al. ................. 364/200 |
| 5,278,973 A | 1/1994 | O'Brien et al. ............. 395/500 |
| 5,301,277 A | 4/1994 | Kanai ........................ 709/301 |
| 5,367,628 A | 11/1994 | Ote et al. ................... 345/501 |
| 5,448,264 A | 9/1995 | Pinedo et al. .............. 345/508 |
| 5,452,456 A | 9/1995 | Mourey et al. ............. 713/100 |
| 5,502,809 A | 3/1996 | Takano ....................... 345/509 |
| 5,640,562 A | 6/1997 | Wold et al. ................. 395/652 |
| 5,666,521 A | 9/1997 | Marisetty ................... 345/525 |
| 5,671,439 A * | 9/1997 | Klein et al. ................. 710/1 |
| 5,742,797 A | 4/1998 | Celi, Jr. et al. ............. 345/507 |
| 5,752,275 A | 5/1998 | Hammond ................... 711/207 |
| 5,757,386 A | 5/1998 | Celi, Jr. et al. ............. 345/507 |
| 5,764,903 A * | 6/1998 | Yu .............................. 709/208 |
| 5,790,825 A | 8/1998 | Traut .......................... 712/209 |
| 5,815,686 A | 9/1998 | Earl et al. ................... 395/500 |
| 5,831,607 A | 11/1998 | Brooks ....................... 345/333 |
| 5,860,147 A | 1/1999 | Gochman et al. .......... 711/207 |
| 5,940,872 A | 8/1999 | Hammond et al. ......... 711/207 |
| 6,014,170 A | 1/2000 | Pont et al. .................. 348/232 |

(Continued)

FOREIGN PATENT DOCUMENTS

EP          0 645 701 A2       9/1994       .......... G06F 9/455

(Continued)

OTHER PUBLICATIONS

U.S. Appl. No. 09/617,709, "System and Method for Emulating the Operation of a Translation Look-Aside Buffer", Traut, filed Jul. 17, 2000.

(Continued)

*Primary Examiner*—Leslie Wong
(74) *Attorney, Agent, or Firm*—Woodcock Washburn LLP

(57) ABSTRACT

A method for performing a write operation to a hard drive or other memory space is provided. The hard drive is represented as at least two files. The first file is a parent drive and includes some content of the hard drive. Writes made to the hard drive are recorded in a second file, known as a differencing drive. Because no changes are made to the content of the parent drive, the content of the hard drive may be rolled back to the content of the parent drive by discarding the differencing drive.

11 Claims, 5 Drawing Sheets

U.S. PATENT DOCUMENTS

| | | | |
|---|---|---|---|
| 6,014,651 A | 1/2000 | Crawford | 705/400 |
| 6,026,476 A | 2/2000 | Rosen | 711/206 |
| 6,067,618 A | 5/2000 | Weber | 713/1 |
| 6,185,580 B1 * | 2/2001 | Day et al. | 707/205 |
| 6,256,658 B1 * | 7/2001 | Mourey et al. | 709/100 |
| 6,594,677 B2 * | 7/2003 | Davis et al. | 707/204 |
| 6,651,132 B1 * | 11/2003 | Traut | 711/6 |
| 6,658,563 B1 * | 12/2003 | Ice et al. | 713/2 |

FOREIGN PATENT DOCUMENTS

| | | |
|---|---|---|
| WO | WO 99/57641 | 11/1999 |
| WO | WO 00/63801 | 10/2000 |

OTHER PUBLICATIONS

U.S. Appl. No. 09/617,669, "System and Method for Displaying Current Images of Virtual Machine Environments", Traut, et al., filed Jul. 17, 2000.

U.S. Appl. No. 09/617,624, "System and Method for Emulating the Operation of a Video Graphics Adapter", Carroll, et al., filed Jul. 17, 2000.

U.S. Appl. No. 09/747,492, "System and Method for the Logical Substitution of Processor Control in an Emulated Computing Environment", Traut, filed Dec. 21, 2000.

U.S. Appl. No. 09/809,731, "Method for Hybrid Processing of Software Instructions of an Emulated Computer System", Giles et al., filed Mar. 15, 2001.

U.S. Appl. No. 09/906,392, "System and Method for the Logical Substitution of Processor Control in an Emulated Computing Environment", Traut, filed Jul. 16, 2001.

"Bootable Hard Drive Emulation for Windows Clients", 3Com Virtual Lan Drive Data Sheet, Feb. 2001, 1-4.

"Processor Instruction Sets," The PC Guide, version date Dec. 18, 2000, http://www.pcguide.com/ref/cpu/arch/Int/Instc.html.

"M68060 User's Manual," Motorola, 1994, pp. i-xviii; Section 4, Memory Management Unit, pp. 4-1 to 4-30, http://e-www.motorola.com/brdata/PDFDB/MICROPROCESSORs/32 BIT/68K-COLDFIRE/M680X0/MC68060UM.pdf.

"MPC750, RISC Microprocessor User's Manual," Motorola, Aug. 1997, Contents, pp. iii-xvi; Chapter 5, Memory Management, pp. 5-1 to 5-34; Glossary, pp. Glossary-1 to Glossary-13, http://e-www.motorola.com/brdata/PDFDB/MICROPROCESSOR/32_BIT/POWERPC/MCPC7XX/MPC750UM.pdf.

PCT International Search Report in International Application No. PCT/US 01/22276, International filiind date Jul. 16, 2001, mail date Jul. 3, 2002.

Traut E, "Building the Virtual PC," *Byte*, McGraw-Hill Inc., vol. 22, No. 11, pp. 51-52, Nov. 1, 1997.

"Intel386 DX Microprocessor," *Intel*, pp. 32-58, Dec. 31, 1995.

"MacIntosh and Technology: Changing Chips in the Middle of the Stream, or Apple Takes a Risc," URL:www.btech.co/changingchips.html, paragraphs 0006!-0007!, retrieved Dec. 10, 2001.

"M68040 User's Manual," Motorola, Inc., Chapter 3, copyright 1990, revised 1992, 1993.

Osisek DL et al., "ESA/390 Interpretive-Execution Architecture, Foundation for VM/ESA," *IBM Systems Journal*, vol. 30, No. 1, pp. 34-51, 1991.

Shang Rong Tsai et al., On the Architectural Support for Logical Machine Systems, *Microprocessing and Microprogramming*, vol. 22, No. 2, pp. 81-96, Feb. 1988.

* cited by examiner

METHOD FOR ESTABLISHING A VIRTUAL HARD DRIVE FOR AN EMULATED COMPUTER SYSTEM RUNNING ON A HOST COMPUTER SYSTEM

CROSS-REFERENCE TO RELATED APPLICATIONS

This application claims the benefit of provisional U.S. Application Ser. No. 60/282,111, filed Apr. 7, 2001, and titled "Method for Establishing a Drive Image in a Computing Environment," which is incorporated herein by reference in its entirety.

TECHNICAL FIELD OF THE INVENTION

The present invention relates in general to the field of computer systems, and, more particularly, to a method for storing data to block-level data storage devices.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

A computer manufacturer will attempt to maximize its market share by having more rather than fewer applications run on the microprocessor family associated with the computer manufacturer's product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus, the host computer can both run software designed for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a virtual machine, as the guest computer system exists only as a software representation of the operation of the hardware architecture in the host computer system. The terms emulator and virtual machine are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system. The emulator program acts as the interchange between the hardware architecture of the host machine and the instructions transmitted by the software running within the emulated environment.

The hard drives and floppy drives of a computer system are known as block devices. A block device is any device, including any memory device, within a computer system that transfers a defined minimum number of bytes of data as part of each access to the device. The defined minimum number of bytes of data is known as a sector or block. Data is stored in the block device in fixed size blocks or sectors of data. Each sector or block within a block device is the same size. In the case of a hard drive, each block or sector is typically 512 bytes in length. The entire block of data must be transferred in the case of an access to any single data element within the block. In the case of a hard drive, for example, the 512 bytes of data, the size of one block, must be passed to main memory, even if only a single byte of the block is part of the read operation. Thus, data must be read from or written to memory in multiples of the block size. Each block of the block device has a unique address. Each block of a block device can be accessed independently and in random access order. Typically, the addressing scheme will involve designating the first block as block 0. Successive blocks are consecutively numbered.

Emulated computer systems typically involve the use of a virtual hard drive image. Some emulated operating systems, such as some Windows operating systems, expect to boot from a hard drive that is a block device. To emulate for the guest operating system the presence of a physical hard drive, the emulation program creates a virtual hard drive image. The emulation program will present the virtual hard drive image to the guest operating system. The guest operating system will boot from the virtual hard drive image and will refer to the virtual hard drive image for all other functions necessitating reading from or writing to a hard drive. The virtual hard drive image often exists as a single file on the physical hard drive of the computer system. Thus, the entire content of the virtual hard drive of the guest computer system are represented as a single file on the physical hard drive of the computer system.

One possible format for a virtual hard drive is a single file that that has a fixed size, flat-mapped format in which the data of the virtual hard drive is laid out on physical hard drive by block address. The data at block 0 of the virtual hard drive is at the start of the file, and continues with the data for block 1 and the next successive blocks. For fixed size virtual hard drive images, the size of the file for the virtual hard drive is as large as the size of the hard drive being emulated. For example, a fixed size virtual hard drive that is 2 gigabytes (GB) in size will occupy a file on the physical hard drive of the computer system that is 2 GB in size.

A second possible format for a virtual hard drive is a single file that has a dynamically expanding format. The dynamically expanding file includes header information that describes the internal data structures of the file. Unlike the fixed size file, the only blocks that are included in the dynamically expanding file are those blocks that have been written to by the emulated computer system. Those blocks that have not been written to are not included in the dynamically expanding file and are assumed to be zeroed. Thus, if the emulated computer system attempts to read from a block of the dynamically expanding file that has not yet been written to, and is not represented in the dynamically expanding file, the emulation program will return to the emulated computer system a block containing all zeros. As new blocks are written to by the emulated computer system, the dynamically expanding file expands to accommodate the newly written block.

The header information of the dynamically expanding file identifies the location of each block in the file. Because blocks are not written to in a sequential manner that tracks the numbering scheme for the available blocks of the virtual hard drive, the header information will track the location of the blocks without regard to their sequential numbering scheme. For example, the data of block 0 may be placed adjacent to the data of block 100 and may be followed by the data of block 50. As such, the location of the blocks in the dynamically expanding file tracks the sequence the sequence that the blocks were written to, rather than tracking the sequence the sequential addressing scheme for the blocks. The header information also includes a bit map. Each bit on the bit map corresponds to an available block of the virtual hard drive. If a bit is a logical 1, the block corresponding to the bit has been written to, and therefore is included in the dynamically expanding file; If a bit is a logical 0, the block corresponding to the bit has not been written to, and is therefore not represented in the dynamically expanding file. Aside from the bit map technique for identifying written blocks in the virtual hard drive, other data structures may be used in the header information of the dynamically expanding file for coordinating the blocks of the virtual hard drive.

SUMMARY OF THE INVENTION

The present invention concerns a method for establishing a drive image in an emulated computer system. The virtual hard drive of the emulated computer system includes a parent drive and at least one differencing drive. Both the parent drive and the differencing drive are represented on physical hard drive of the host computer system as a single file. Writes by the emulated computer system to the virtual hard drive are recorded in the memory space of the differencing drive, which expands to accommodate writes to the differencing drive. Included in the differencing drive is a bit map for identifying the blocks of the virtual hard drive that have been written to or recorded in the differencing drive. The differencing drives of the present invention may be cascaded. A differencing drive may be added such that the original differencing drive is the parent of the newly added differencing drive. When the target drive for write operations is switched to the newly added differencing drive, the content of the original differencing drive is fixed and writes to the virtual hard drive by the emulated computer system are made to the newly added differencing drive.

The virtual hard drive of the present invention may be used as a means of protecting or preserving the content of a hard drive image outside the emulating computing environment. The technique of the present invention may be used in a traditional single-user computing environment to preserve the protect the content of the hard drive during sensitive computing operations. In the networked computing environment, a single parent drive may be shared by several client computers. The parent drive may be maintained at a server computer and each of the client computers may include a differencing drive that includes the writes made by the client computer to the parent drive of the server computer.

The method disclosed herein is advantageous in that it provides for the preservation of a memory space in a computing environment. Changes to the memory space are made in an adjacent file. Because the original memory space is preserved, the user can choose to roll the status of the memory space back to its original state. This is accomplished by simply discarding or ignoring the content of the differencing drive. In the case of cascaded drives, successive differencing drives may be used to track successive changes to the content of the memory space. Following this approach, the user can return the content of the memory space to one of several prior states.

The method disclosed herein is also advantageous in that it can be used in single-user computing environment and the networked computing environment, in addition to use of the method in the emulated computing environment. In the single-user environment, the method is advantageous in that the technique can be used to protect the content of the memory space of the computer system during sensitive computing operations or when the system is at risk of a virus. In the networked computing environment, each of several clients can write to a memory location maintained by a server computer. The changes are not made to the central memory location. Rather, changes are made to differencing drives that are unique to each client computer and are stored at the client computers or at the server computer.

Other technical advantages of the present invention will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The present invention provides an emulation environment in which a differencing drive may be used to define the content of the virtual hard drive of the emulated computer system. A differencing drive is a file or a series of files that tracks the altered content of another hard drive, such as a physical hard drive or, in the emulated environment, a virtual hard drive. In the case of a virtual hard drive, a differencing drive may be used in conjunction with both fixed size virtual hard drives and dynamically expanding virtual hard drives. The present invention also has application outside the emulated computing environment and may be used in any computing environment in which it is desired to track the content of a drive image through a differencing drive that tracks the altered content of the parent drive image.

Figure 1:
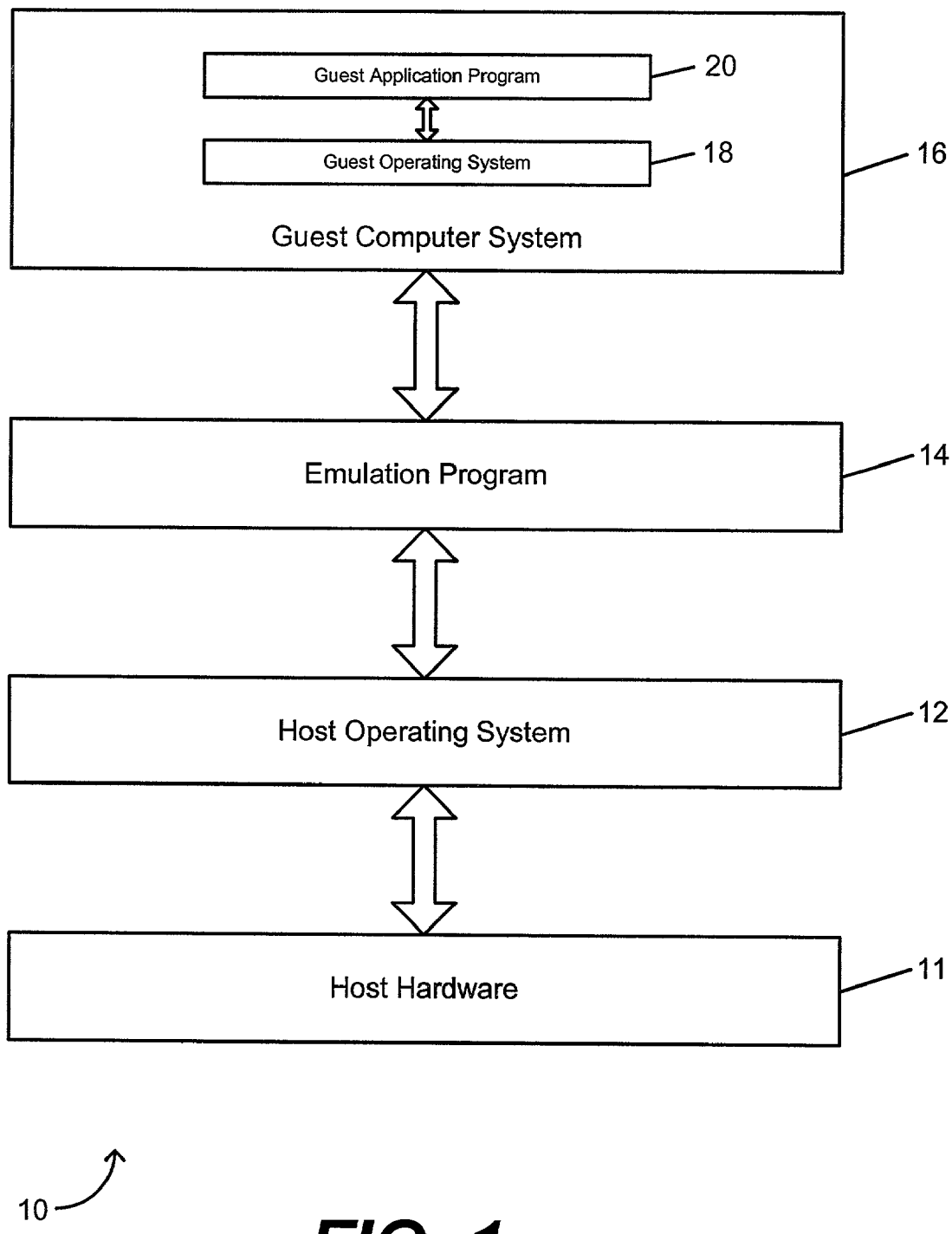
FIG. 1 is a diagram of the logical relationship of the elements of an emulated computer system running on a host computer system.

With respect to the emulated computing environment, shown in FIG. 1 is a diagram of the logical layers of the hardware and software architecture for an emulated operating environment in a computer system 10. An emulation program 14 runs on a host operating system 12 and host hardware architecture 11. Emulation program 14 emulates a guest computer system 16, including a guest operating system 18. A guest software application 20 runs on guest operating system 18. In the emulated operating environment of FIG. 1, because of the operation of emulation program 14, guest software application 20 can run on the computer system 10 even though guest software application 20 is designed to run on an operating system that is generally incompatible with the host operating system 12 and host hardware architecture 11.

Figure 2:
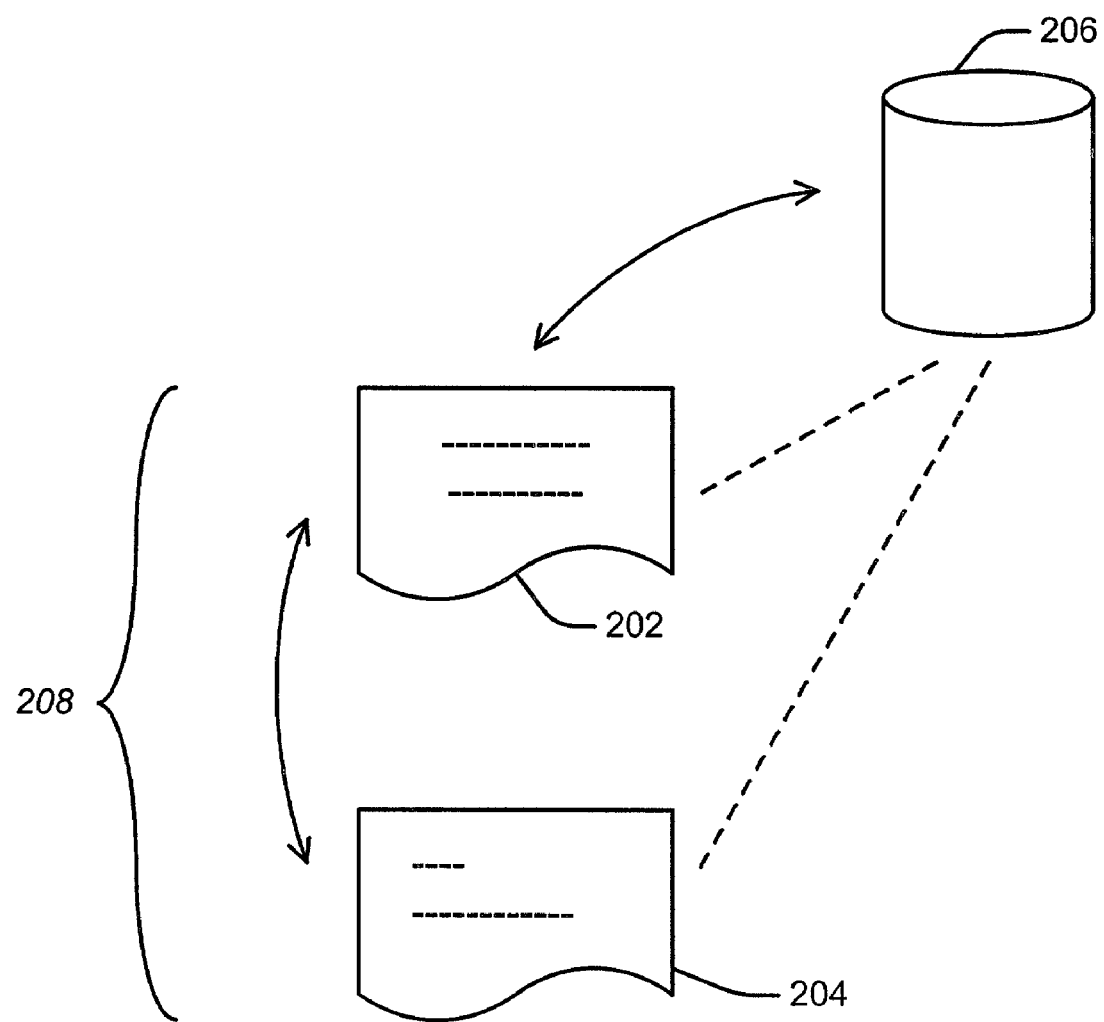
FIG. 2 is a diagram of the logical relationship of a physical hard drive, parent, drive, and differencing drive.

Shown in FIG. 2 is the logical relationship between a drive image 202 and a corresponding differencing drive 204. As shown in FIG. 2, both the drive image 202 and the differencing drive 204 are represented on the physical hard drive 206 as a single file. Differencing drive 204 supplements and tracks the content of drive image 202. In this relationship, drive image 202 is the parent drive of differencing drive 204. Together, drive image 202 and differencing drive 204 comprise a single virtual hard drive 208 for use by the emulated computer system. The guest operating system 18 (FIG. 1), however, still views drive image 202 as the hard drive of the emulated computer system.

When the emulated computer system is initialized, the differencing drive is empty except for the presence of header information. When the guest operating system attempts to write to the drive image, the block or blocks of the write operation are not written to the drive image. Rather, the block or blocks of the write operation are written to the differencing drive. To accommodate the size of the block or blocks of the write operation, the differencing drive expands to accommodate the block or blocks of the write operation. As part of the write operation, the header information of the differencing drive is updated to reflect the content of the differencing drive. Like a dynamically expanding drive, the differencing drive includes a bit map. In the case of a differencing drive, each bit of the bit map corresponds to one of the available blocks of the virtual hard drive. If a bit of the bit map of the differencing drive is a logical 1, the content of the corresponding block has been written to and is present in the differencing drive. If a bit of the bit map of the differencing drive is a logical 0, the content of the corresponding block either has not been written to or the content of the corresponding block can be found in the parent drive of the differencing drive. Although the differencing drive performs in many ways like a dynamically expanding drive, the differencing drive can be a complement to either a fixed size drive as a parent drive or a dynamically expanding drive as a parent drive.

Figure 3:
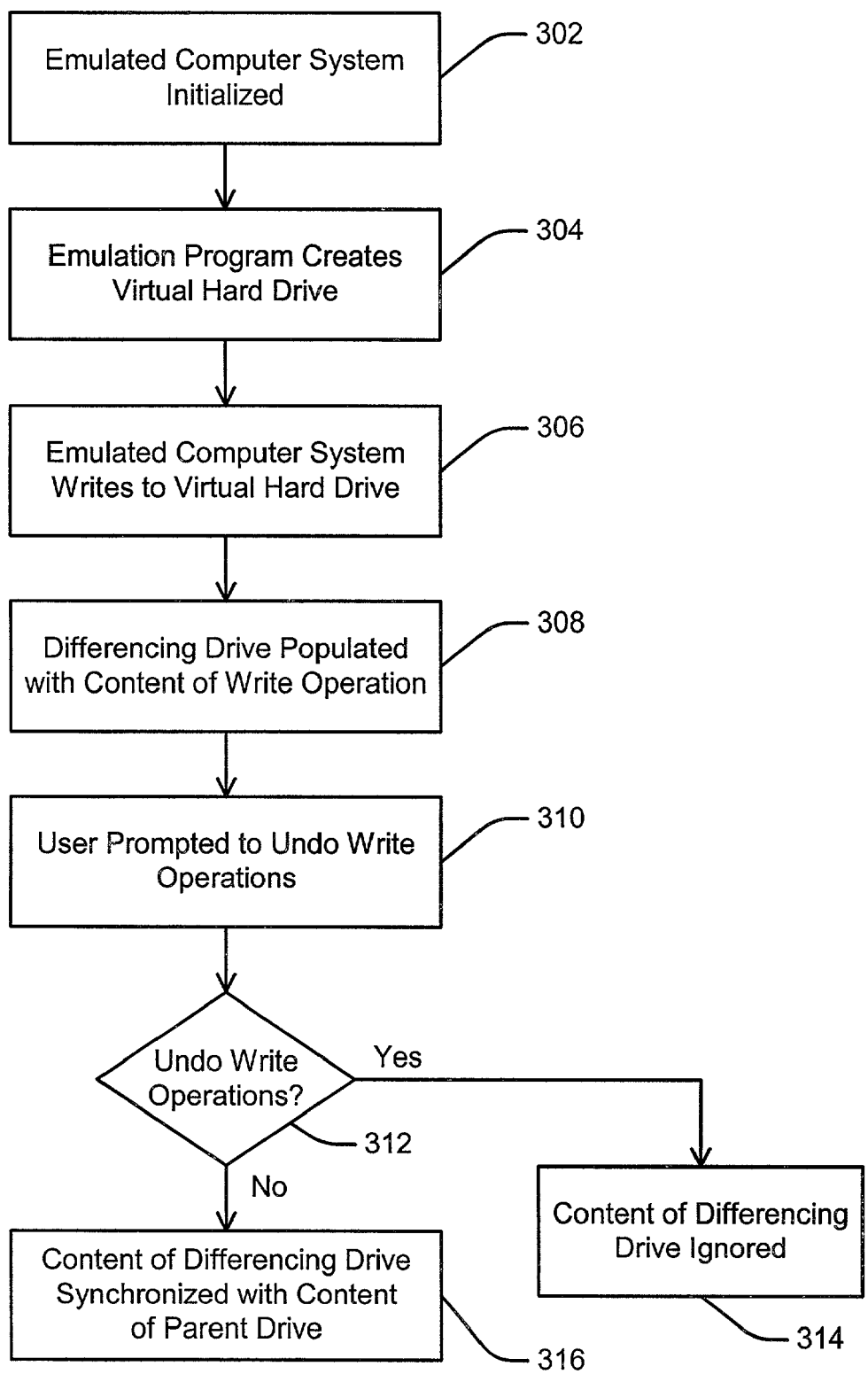
FIG. 3 is a flow diagram of a process for using a differencing drive to create an undoable hard drive in an emulated computer environment.

One potential application for a differencing drive is in the case of undoable hard drives in emulated computing environments. Shown in FIG. 3 is a flow diagram of a process for using a differencing drive to create an undoable hard drive in an emulated computer environment. Upon initialization of the emulated computer system at step 302, the emulation program will create at step 304 a virtual hard drive that is comprised of a parent drive and a differencing drive. The user of the emulated computer system may not know that a differencing drive is being used as an element of the virtual hard drive of the computer system. As the user uses the emulated computer system in a manner that causes write operations (step 306) to the virtual hard drive, the file that makes up the differencing drive is populated at step 308 to accommodate the content of the write operations to the virtual hard drive. After the user has completed the emulated computing session, the user is prompted at step 310 and is asked whether the user would like to undo the transactions made to the hard drive during the emulated computing session.

If the user determines at step 312 that the user would prefer to undo any writes made to the virtual hard drive during the emulated computing session, the content of the differencing drive is ignored at step 314 and the content of the parent drive is assumed to form the entire content of the virtual hard drive. If, however, the user determines at step 312 that the user would prefer not to undo the writes made to the virtual hard drive during the emulating computing session, a synchronization step is performed at step 316 to synchronize the content of the parent drive to the content of the differencing drive. The synchronization step involves writing to the parent drive those blocks that are present in the differencing drive. As part of the synchronization step, if a block found in the differencing drive is also present in the parent drive, the block in the parent drive is overwritten with the content of the block in the differencing drive. If a block found in the differencing drive is not found in the parent drive, the block of the differencing drive is written to the parent drive as part of the synchronization step.

In the example of FIG. 3, the user is prompted to undo the content of the virtual hard drive at the end of a computer session. In addition, the user may be prompted to undo the content of the virtual hard drive at regular intervals. As an example, the user may be prompted at one hour intervals to reconcile the content of the virtual hard drive. In this manner, for extended computing sessions, the differencing drive is not allowed to expand unreasonably as additional write operations are made to the virtual hard drive. If the parent drive is a fixed-size drive, it may be desirable to undo or reconcile the virtual hard drive at regular intervals during a lengthy computer session to avoid having an excessive and unnecessary amount of space on the physical hard drive devoted to the virtual hard drive of the emulated computer system.

Figure 4:
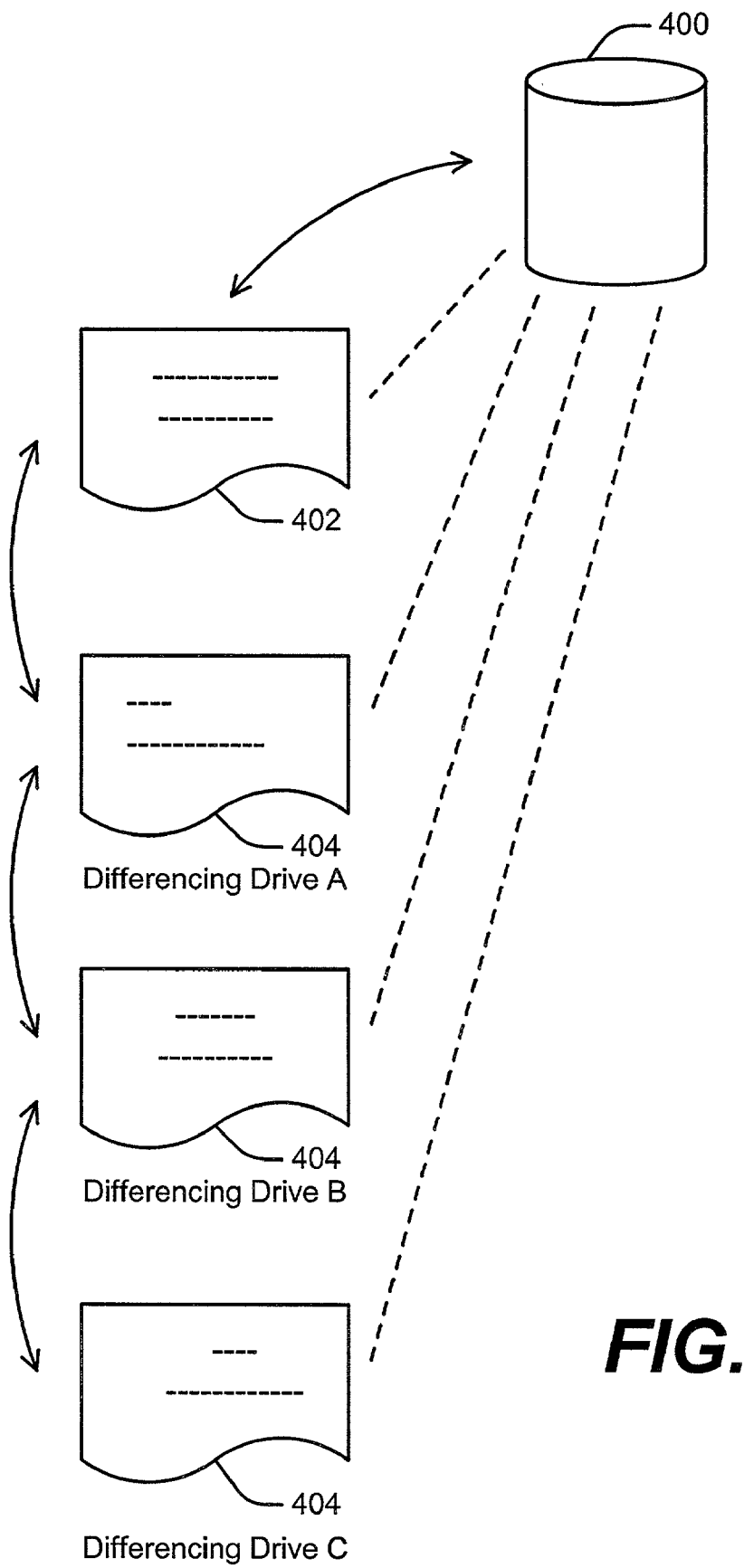
FIG. 4 is a diagram of the logical relationship of a physical hard drive, parent drive, and multiple differencing drives.

As another implementation of the present invention, the differencing drives may be cascaded such that the virtual hard drive include a parent drive and multiple differencing drives. In such an arrangement, the first drive is referred to as the ultimate parent drive. The ultimate parent drive does not serve as a referencing drive for any other drive. In contrast, a differencing drive may be a parent drive for another differencing drive. In this scenario, differencing drives may be established over time, with each differencing drive referring to the prior drive or the ultimate parent drive as its parent drive. Shown in FIG. 4 is a logical diagram of an ultimate parent drive 402 and several differencing drives 404. In the example of FIG. 4, the user is given the option of creating additional differencing drives during the computing session. Each newly created differencing drives refers as a parent to the ultimate parent drive, if the differencing drive is the first differencing drive created, or to the prior differencing drive, if the differencing drive is not the first differencing drive created. In FIG. 4, once Differencing Drive B is initiated by the user, the emulation program freezes the content of Differencing Drive A and instead begins writing new content to Differencing Drive B. Similarly, once Differencing Drive C is initiated by the user, the emulation programs stops writing content to Differencing Drive B and begins using Differencing Drive C as the location for write operations to the virtual hard drive.

When the operating system wants to do a read operation from a virtual hard drive, the emulation program directs the operating system to the proper differencing drive for the read operation. The emulation program searches the header information of each differencing drive, beginning with the most recently created differencing drive and continuing to the ultimate parent drive, until the emulation program locates an entry for the requested block. If the user chooses to reconcile the differencing drives into a single parent drive, the emulation program determines, for each block of the virtual hard drive, whether that block of the virtual hard drive has been written to in one of the differencing drives. If the block has been written to in one of the differencing drives, the emulation program selects the block from the most recently created differencing drive and copies that block to the ultimate parent drive, overwriting if necessary the data in the block of the ultimate parent drive.

The cascading of several differencing drives allows the computer user to protect the content of the virtual hard drive during the computing session. This feature is especially advantageous whenever it is desirable for the user to be able to revert back to the content of the hard drive at a prior time in the computing session. This feature may be used, for example, in the software installation process. The user, prior to begin a software install, may choose to initiate a cascading differencing drive that refers, depending on the sequence of its initiation, to a parent drive or another differencing drive as its parent drive. In this manner, if the installed software interferes with the integrity of the system or with the operation of other system software or hardware, the user can easily revert to the state of the virtual hard drive prior to the installation of the software, without having to run an uninstall utility on the recently installed software application. Similarly, the user may choose to initiate another differencing drive when there is a danger or suspicion that the activity of the user may allow a virus to enter the computer system. In this way, an original disk image may remain in a pristine, unmodified state, while the user is allowed to roll back the contents of the virtual hard drive when the content of one or more differencing drives is no longer wanted or needed.

The automated use of cascaded differencing drives may be used to create, at regular intervals, a series of differencing drives, allowing the user to roll back the content of the virtual hard drive if the user later experiences a computer system problem. In this example, a differencing drive may be created for the user once per hour. Although the creation of a series of automated differencing drives may occur in the background, the time interval for the creation of a differencing drive may be specified by the user.

Figure 5:
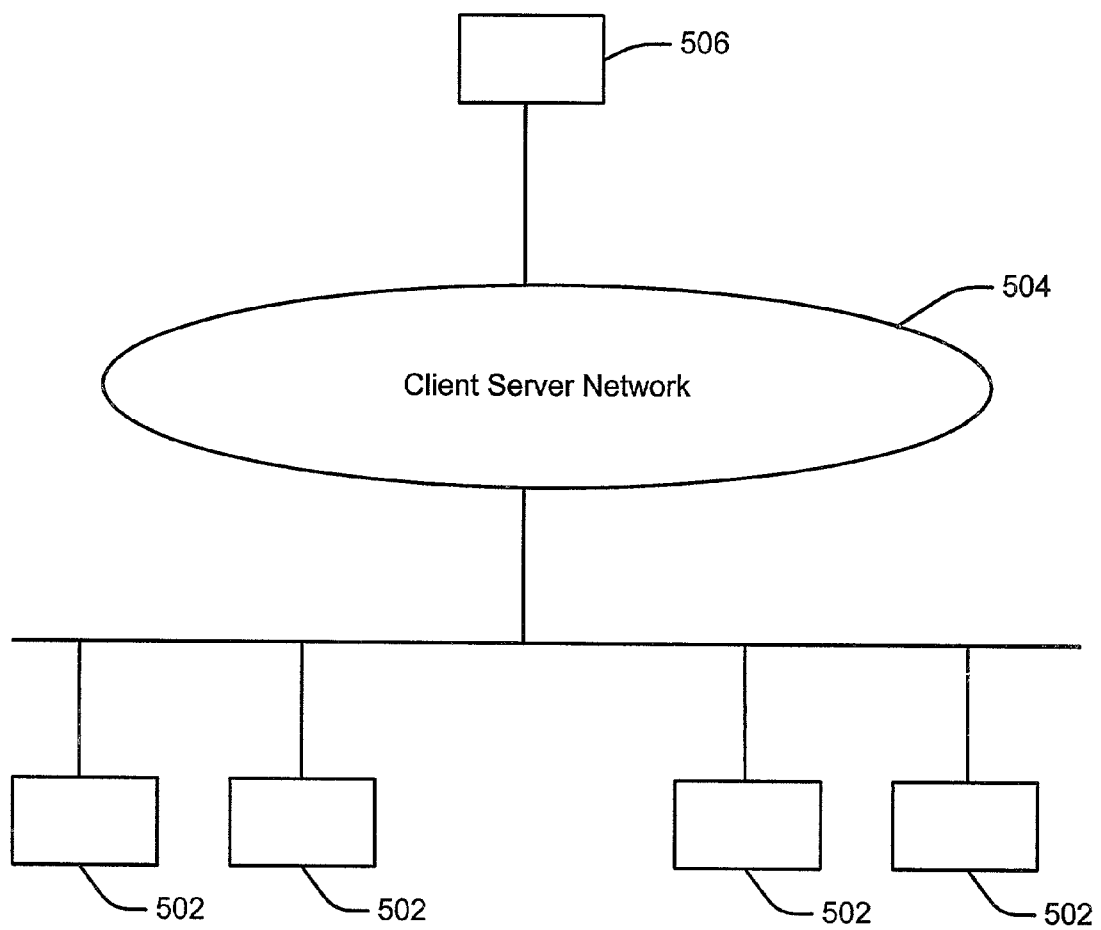
FIG. 5 is a diagram of a networked computer system.

The use of differencing drives also allows a single parent drive to be shared among several virtual computer systems. The several computer systems in this example may be running on the same host machine or may be running on separate host machines or a shared network connection. Shown in FIG. 5 is a network diagram in which several computer systems 502 (client systems) may be connected as part of a client server network 504 to a data or storage server 506. The use of differencing drives avoids the necessity of storing common data on each of client computer systems 502. Rather, client computer systems 502 can access common, static content existing on storage server 506. In this example, the parent drive is in storage server 506. Only the differences to the content of storage server 506 must be recorded in the differencing drive. If one of the client computer systems 502 performs a write operation to the storage server 506, the text of the storage request is written to a differencing drive, which may be stored, depending on the implementation of the computer network, in a differencing drive in the local memory of one of the client computer systems 502 or in a memory location at the data or storage server 506.

Differencing drives may be used outside of the context of emulated computer systems, and may be used in computing environments in which access to the parent drive is much slower than access to the differencing drive. In the case of client server network 504, for example, the access to data stored in storage server 506 may be much slower than access to data stored locally at one of client computer systems 502. Modified, frequently accessed data is stored locally in the differencing drive at client computer systems 502, allowing the client computer systems to access this data more quickly than can be done through the network connection.

A differencing drive may be used in any computing environment, including use on a standalone personal computer, in which it is desirable that one drive image (the parent drive) remains unchanged while altered content that is intended to be written to the memory location of the drive image is instead written to a second file (differencing drive). As an example, a personal computer may include more than one block device, allowing one block device to function as the parent drive, and the second block device to function as the differencing drive. In this arrangement, the first block device can remain in a pristine and unaltered state while all writes operations are made to the second block device. At some later time, the content of the two block devices can be synchronized or the content of the second block device can be disregarded to allow the computer user to return to the content of the first block device as it existed at some point in the computing session. As in the case of an emulated computing environment, cascaded differencing drives may be used in the case of the non-emulated computing environment.

The use of a differencing drive is advantageous in that it provides for a data structure in which writes to a virtual hard drive are instead written to a single file that dynamically expands to include all of the changes to the parent drive. The use of a differencing drive is largely transparent to the computer user in that the computer user is not aware that writes are being made to a file that comprises the differencing drive rather than to the parent drive of the virtual hard drive.

The present invention is not limited in its application to the emulation of a particular computer system architecture, particularly the Intel 80X86 architecture. Rather, the emulation technique disclosed herein is applicable any time it is desirable that a host operating system be transparently disconnected from the processor with respect to at least some of the processor settings of the processor.

What is claimed is:

1. A method for performing a write operation to a virtual hard drive of an emulated computer system, comprising the steps of:
    establishing in a hard drive of a host computer system a plurality of files comprising the virtual hard drive of the emulated computer system, the plurality of files including a file associated with a parent drive and a file associated with a differencing drive, the parent drive appearing to the emulated computer system to be a physical hard drive of the emulated computer system; and the differencing drive comprising a bit map that identifies blocks of the virtual hard drive that are present in the differencing drive;
    performing a write operation in the emulated computer system to the virtual hard drive of the emulated computer system; and
    recording a result of the write operation in the differencing drive of the virtual hard drive such that write operations performed to the virtual hard drive of the host computer system are performed in the differencing drive rather than in the parent drive.

2. The method for performing the write operation to the virtual hard drive of the emulated computer system of claim 1, wherein the step of recording the result of the write operation comprises expanding the size of the file associated with the differencing drive to accommodate the written to blocks of the differencing drive.

3. A method for performing an undo operation on a virtual hard drive of an emulated computer system, comprising the steps of:
    establishing in a hard drive of a host computer system a plurality of files comprising the virtual hard drive of the emulated computer system, the plurality of files including a file associated with a parent drive and a file associated with a differencing drive, the parent drive appearing to the emulated computer system to be a physical hard drive of the emulated computer system;
    performing a write operation in the emulated computer system to the virtual hard drive of the emulated computer system;
    recording a result of the write operation in the differencing drive of the virtual hard drive such that write operations performed to the virtual hard drive of the host computer system are performed in the differencing drive rather than in the parent drive; and
    prompting a user of the emulated computer system for a determination of whether the content of the hard drive of the emulated computer system at the conclusion of a computing session should revert to the content of the virtual hard drive at an earlier time;
    upon the decision of the user to revert to the content of the virtual hard drive at an earlier time, discarding the content of the virtual differencing drive such that the content of the hard drive of the emulated computer system is the content of the virtual parent drive.

4. The method for performing the undo operation on the virtual hard drive of the emulated computer system of claim 3, wherein the step of prompting the user for the determination comprises the step of prompting the user of the emulated computer system at regular intervals during the user's computing session.

5. A method for synchronizing the content of a virtual hard drive of an emulated computer system, comprising the steps of:
    establishing in a hard drive of a host computer system a plurality of files comprising the virtual hard drive of the emulated computer system, the plurality of files including a file associated with a parent drive and a file associated with a differencing drive, the parent drive appearing to the emulated computer system to be a physical hard drive of the emulated computer system;
    performing a write operation in the emulated computer system to the virtual hard drive of the emulated computer system;
    recording a result of the write operation in the differencing drive of the virtual hard drive such that write operations performed to the virtual hard drive of the host computer system are performed in the differencing drive rather than in the parent drive; and
    prompting a user of the emulated computer system for a determination of whether the content of the virtual hard drive of the emulated computer system should revert to the content of the virtual hard drive at an earlier time;
    upon the decision of the user to retain the content of the virtual hard drive, synchronizing the content of the virtual hard drive of the emulated computer system by writing the content of the differencing drive to the parent drive.

6. A virtual hard drive of an emulated computer system, the emulated computer system running on a host computer system, comprising:
    a first file on a physical hard drive of the computer system comprising a parent drive;
    a second file on the physical hard drive of the host computer system comprising a primary differencing drive;
    a third file on the physical hard drive of the host computer system comprising a secondary differencing drive; and
    wherein write operations to the virtual hard drive are made to the primary differencing drive during a first time interval, the primary differencing drive recording the writes to the virtual hard drive and expanding in size to accommodate the content of the write operations to the virtual hard drive during the first time interval;
    wherein write operations to the virtual hard drive are made to the secondary differencing drive during a second time interval, the secondary differencing drive recording the writes to the virtual hard drive and expanding in size to accommodate the write operations to the virtual hard drive during the second time interval.

7. The virtual hard drive of an emulated computer system of claim 6, wherein the second file and the third file of the physical hard drive are dynamically expanding files.

8. The virtual hard drive of an emulated computer system of claim 6, wherein the first file is a dynamically expanding file.

9. The virtual hard drive of an emulated computer system of claim 6, wherein the first file is a fixed size file.

10. A method for performing a write operation to a virtual hard drive of an emulated computer system, comprising the steps of:
   establishing in a hard drive of a host computer system a plurality of files comprising the virtual hard drive of the emulated computer system, the plurality of files including a first file associated with a parent drive, a second file associated with a primary differencing drive, and a third file associated with a secondary differencing drive, the parent drive appearing to the emulated computer system to be a physical hard drive of the emulated computer system;
   performing a first write operation in the emulated computer system to the virtual hard drive of the emulated computer system;
   recording a first result of the first write operation in the primary differencing drive of the virtual hard drive such that write operations performed to the virtual hard drive of the host computer system are performed in the primary differencing drive rather than in the parent drive;
   switching the target drive to the secondary differencing drive;
   performing a second write operation in the emulated computer system to the virtual hard drive of the emulated computer system; and
   recording a second result of the second write operation in the secondary differencing drive of the virtual hard drive such that write operations performed to the virtual hard drive of the host computer system are performed in the secondary differencing drive rather than in the parent drive.

11. The method for performing the write operation to the virtual hard drive of an emulated computer system of claim 10, further comprising discarding the content of the secondary differencing drive to return the content of the virtual hard drive to the content of the virtual hard drive at a time of the switch of the target drive to the secondary differencing drive.

* * * * *

UNITED STATES PATENT AND TRADEMARK OFFICE
CERTIFICATE OF CORRECTION

PATENT NO. : 6,968,350 B2
APPLICATION NO. : 09/918295
DATED : November 22, 2005
INVENTOR(S) : Eric P. Traut et al.

It is certified that error appears in the above-identified patent and that said Letters Patent is hereby corrected as shown below:

On the title page, item (56), under "U.S. Patent Documents" in column 1, line 1, below "4,779,188 A   10/1988   Gum et al. ........ 364/200" insert -- 4,875,186   10/1989   Blume, Jr. .......... 364/900 --.

On the title page, item (56), under "U.S. Patent Documents" in column 1, line 4, below "5,367,628 A   11/1994   Ote et al. ........ 345/501" insert -- 5,406,644   4/1995   MacGregor ........... 395/500 --.

On the title page, item (56), under "Foreign Patent Documents" in column 2, line 1, below "EP    0 645 701 A2    9/1994 ........ G06F 9/455" insert -- EP    0 524 773 A1   7/1992 .......... G06F 9/44 --.

On the title page, item (56), under "Foreign Patent Documents" in column 2, line 2, below "EP    0 645 701 A2    9/1994 ........ G06F 9/455" insert -- WO   WO 98/57262   12/1998 --.

On page 2, item (56), under "Other Publications" in column 2, line(s) 3-4, delete "MICROPROCESSORs/32 BIT" and insert -- MICROPROCESSORS/32_BIT --, therefor.

On page 2, item (56), under "Other Publications" in column 2, line 10, delete "MICROPROCESSOR" and insert -- MICROPROCESSORS --, therefor.

On page 2, item (56), under "Other Publications" in column 2, line 11, delete "MCPC7XX" and insert -- MPC7XX --, therefor.

On page 2, item (56), under "Other Publications" in column 2, line 13, delete "filiind" and insert -- filing --, therefor.

On page 2, item (56), under "Other Publications" in column 2, line 21, delete "0006!–0007!" and insert -- '0006!–'0007! --, therefor.

On page 2, item (56), under "Other Publications" in column 2, line(s) 28-30, below "Shang Rong Tsai et al., On the Architectural Support for Logical Machine Systems, Microprocessing and Microprogramming, vol. 22, No. 2, pp. 81-96, Feb. 1988." insert -- PCT International Search Report in International Application No. PCT/US 01/22277, International filing date 7/16/01, mail date 2/7/02. --.

UNITED STATES PATENT AND TRADEMARK OFFICE
CERTIFICATE OF CORRECTION

PATENT NO. : 6,968,350 B2
APPLICATION NO. : 09/918295
DATED : November 22, 2005
INVENTOR(S) : Eric P. Traut et al.

It is certified that error appears in the above-identified patent and that said Letters Patent is hereby corrected as shown below:

In column 9, line 34, in Claim 1, after "system" delete ";".

In column 10, line 3, in Claim 3, after "system" insert -- at the conclusion of a computing session --.

In column 10, line 4, in Claim 3, insert -- virtual -- before "hard drive".

In column 10, line(s) 5-6, in Claim 3, after "system" delete "at the conclusion of a computing session".

In column 10, line 10, in Claim 3, delete "virtual" before "differencing drive".

In column 10, line 11, in Claim 3, insert -- virtual -- before "hard drive".

In column 10, line 12, in Claim 3, after "of the" delete "virtual".

In column 10, line 37, in Claim 5, after "system" insert -- at the conclusion of a computing session --.

Signed and Sealed this

Twenty-second Day of September, 2009

David J. Kappos
*Director of the United States Patent and Trademark Office*